US005668325A

United States Patent [19]
Hart et al.

[11] Patent Number: 5,668,325
[45] Date of Patent: Sep. 16, 1997

[54] METHOD AND APPARATUS FOR DETERMINING COMPRESSIVE STRESS IN PILLARS

[75] Inventors: Wm. Mark Hart, Littleton, Colo.; Jinsheng S. Chen; Syd S. Peng, both of Morgantown, W. Va.

[73] Assignee: Cyprus Amax Coal Company, Englewood, Colo.

[21] Appl. No.: 622,816

[22] Filed: Mar. 27, 1996

[51] Int. Cl.$^6$ .................................................. G01N 3/08
[52] U.S. Cl. ........................... 73/81; 73/819; 73/784
[58] Field of Search ............................. 73/760, 784, 788, 73/790, 796, 818, 819; 405/288

[56] References Cited

U.S. PATENT DOCUMENTS

| | | | |
|---|---|---|---|
| 3,600,938 | 8/1971 | Waddell | 73/783 |
| 4,913,499 | 4/1990 | Smart | 73/784 |
| 5,423,638 | 6/1995 | Merriman | 405/292 |
| 5,542,788 | 8/1996 | Stankuds et al. | 73/761 |

*Primary Examiner*—Richard Chilcot
*Assistant Examiner*—Max H. Noori
*Attorney, Agent, or Firm*—Bruce E. Dahl

[57] ABSTRACT

Apparatus for determining compressive stress in an in-situ roof support pillar may comprise a convergence meter positioned in one of the two entries for measuring the total entry convergence, i.e., roof sag and floor heave, and for generating an output signal related thereto. A computer system connected to the convergence meter is responsive to the output signal and calculates the compressive stress in the pillar based on the total entry convergence and based on whether the pillar is being subjected to at least one of a number of load types including a first front abutment load, a second front abutment load, and a side abutment load.

17 Claims, 9 Drawing Sheets

5,668,325

METHOD AND APPARATUS FOR DETERMINING COMPRESSIVE STRESS IN PILLARS

FIELD OF THE INVENTION

This invention relates to underground mining in general and more specifically to a method and apparatus for determining the compressive stress in roof support pillars in an underground coal mine.

BACKGROUND

Underground mining of a coal body or seam is usually accomplished in two distinct phases. In the first phase, generally referred to as development mining or advance mining, the coal seam to be worked is divided and subdivided into several discrete areas by driving sets of entries into the coal seam according to a development pattern established for the proposed mine. Once the development phase is complete, the second phase, usually referred to as retreat mining, is initiated. Both mining phases, i.e., development and retreat, are usually carried out simultaneously in a given coal seam, with retreat mining occurring in previously developed areas and with development mining occurring in new areas of the seam.

The entry sets used to divide and subdivide the coal seam into discrete areas generally comprise a plurality of tunnels or entries that are oriented in generally parallel, spaced-apart relation. The entries in each entry set are connected together by a plurality of cross-cuts that are generally located transverse to each entry in the set. The arrangement is such that the entries and transverse cross-cuts together define a grid-like pattern of tunnels or entries that are separated by plurality of in-situ coal pillars. The pillars provide primary roof support in the mine.

Entry sets may be classified into different groups depending on their location and purpose within the mine. For example, the first entry set that is driven into the coal seam is usually referred to as the main entry set or simply "mains." The main entry set may comprise as many as eight or more individual entries in order to satisfy long-term mining requirements. Once the mains are established, a series of submain entries or cross entry sets may be driven into the coal seam at transverse angles with respect to the mains (usually 90°) in order to further divide the seam into smaller and more workable sizes. Further subdivision of the coal seam may be effected by driving room entries at transverse angles (again usually 90°) from the cross entries.

The number of entries comprising a given kind of entry set is usually determined by the requirements of ventilation, haulage, escapeways, and mine services such as power, water, and drainage. Other factors that can affect the size and number of entries comprising an entry set include the relative strength of the roof, the type and size of the mining and transportation equipment that is to be used and, of course, the nature and strength of the coal itself and the surrounding strata.

As was mentioned above, the entry sets that are driven into the coal seam during the development phase conform to the development pattern, which itself is based on the type of mining system to be used. For example, if the selected mining system is to be continuous or shortwall, entry development commonly follows a room and pillar plan. If the selected mining system is longwall, pairs of parallel entry sets, usually referred to as "gateroad entries" are driven into the coal seam from the mains or submains to define longwall panels. Each longwall panel is then removed by a suitable longwall shearing machine.

Regardless of the type of mining system that is to be used, e.g., continuous, shortwall or longwall, the entry sets that are driven into the coal seam during the development phase nearly always rely on in-situ coal pillars for primary roof support. As was briefly mentioned above, in-situ coal pillars are large blocks of coal that are defined by the various entries and cross-cuts that comprise the entry set. While the size of the pillars depends on the particular mine in which they are used, they tend to be 40 or so feet wide and may have lengths of 100 feet or more.

Since the in-situ pillars provide the primary support for the entry roof, it is imperative for mine safety that the pillars be of a size sufficient to adequately support the roof all times, both during the development phase and the retreat phase. A highly stressed pillar can be unstable and, if the compressive stress exceeds the yield strength of the pillar, the pillar can fail, with catastrophic consequences. Consequently, early mining operations tended to follow development plans that called for oversized pillars to provide wide safety margins. Unfortunately, such oversized pillars also represented a substantial amount of coal which, under most circumstances, could never be recovered.

Over the years various methods and devices have been developed in attempts to allow mine operators to better determine the compressive stress on pillars, so that they can be made as small as possible while still providing adequate safety margins. One such method has been to install strain gauge transducers deep within the pillars to allow the compressive stress to be monitored directly. While such strain gauge transducers do allow the compressive stress to be more accurately determined, they are not without their disadvantages. For example, since the strain gauge transducers must be placed deep within the pillar, it is necessary to first drill a hole into the pillar before the transducer can be installed. Also, once installed, it is not practical to remove the strain gauge transducer. As a result, the transducers are eventually lost to the gob.

Consequently, a need exists for a method and apparatus for determining the compressive stress in pillars that does not rely on the use of strain gauge transducers, with all their associated disadvantages. Ideally, such a method and apparatus would allow the compressive stress to be accurately determined for any pillar and during any phase of the mining operation. Additional advantages could be realized if the associated hardware could be re-used and not lost to the gob.

SUMMARY OF THE INVENTION

Apparatus for determining compressive stress in an in-situ roof support pillar may comprise a convergence meter positioned in one of the two entries for measuring the total entry convergence, i.e., roof sag and floor heave, and for generating an output signal related thereto. A computer system connected to the convergence meter is responsive to the output signal and calculates the compressive stress in the pillar based on the total entry convergence, and based on whether the pillar is being subjected to at least one of a number of load types including a first front abutment load, a second front abutment load, and a side abutment load.

In another embodiment apparatus for determining comprehensive stress in a longwall mining system may comprise a first monitoring station for measuring the entry convergence in the tail entry and a second monitoring station for measuring the entry convergence in the head entry. The first monitoring station may include a first convergence meter positioned at a first location outby the face and a second convergence meter positioned at a second location outby the first location of the first convergence meter. The second monitoring station may include a first convergence meter positioned at a first location outby the face, a second convergence meter positioned at a second location outby the first location, a third convergence meter positioned at a third location outby the second location, and a fourth convergence meter positioned at a fourth location outby the third location. Compressive stress calculation apparatus connected to the first and second monitoring stations calculates the compressive stress in at least one of the pillars based on the entry convergence and based on whether the pillar for which the compressive stress is being calculated is being subjected to at least one of a number of load types including a first front abutment load, a second front abutment load, and a side abutment load.

A method for determining compressive stress in an in-situ roof support pillar may comprise the steps of measuring the total entry convergence, determining a type of load on the pillar, and calculating the compressive stress based on the entry convergence and based on the type of load on the pillar.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
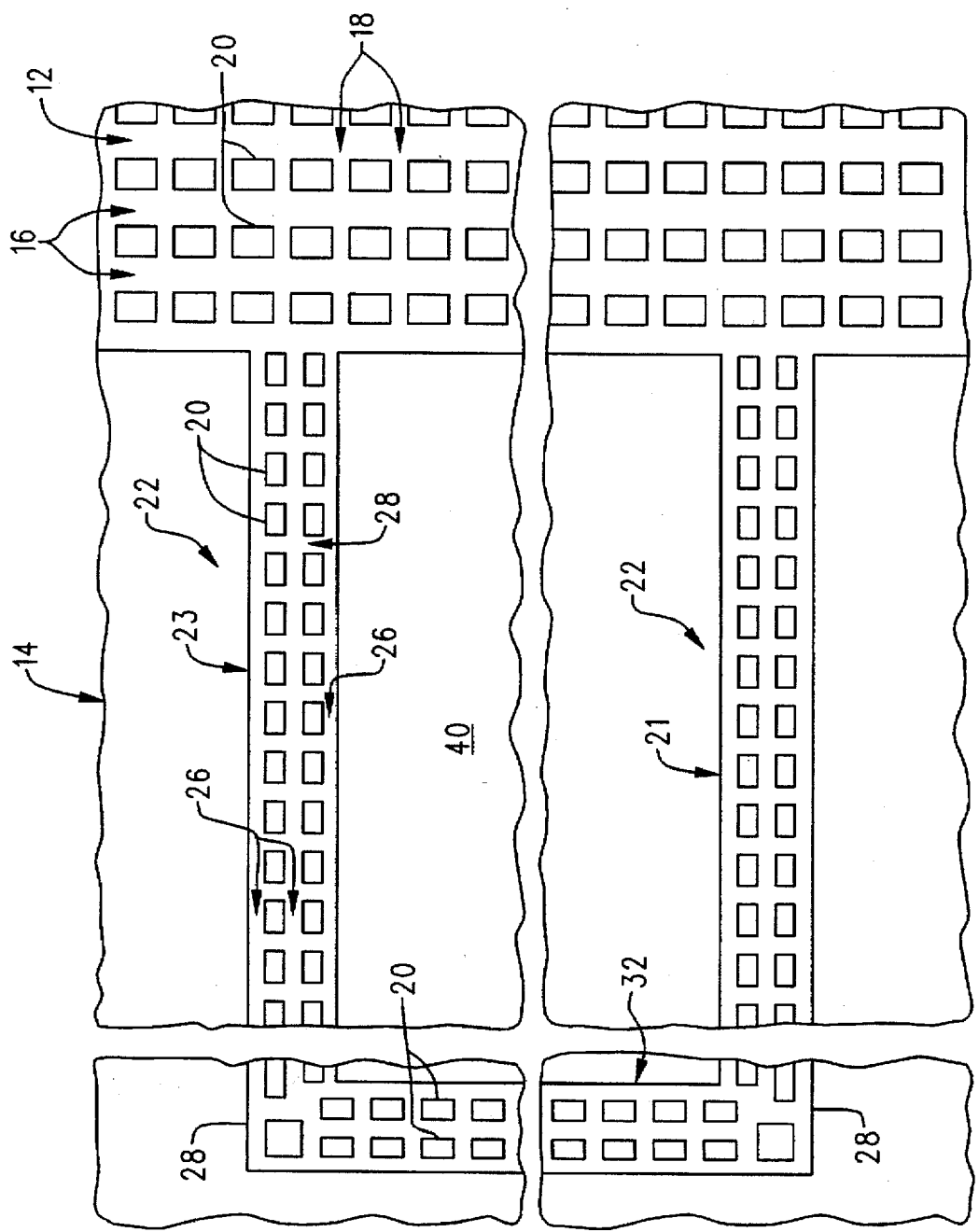
FIG. 1 is a plan view of an entry set structure for use with a longwall mining system.
Figure 2:
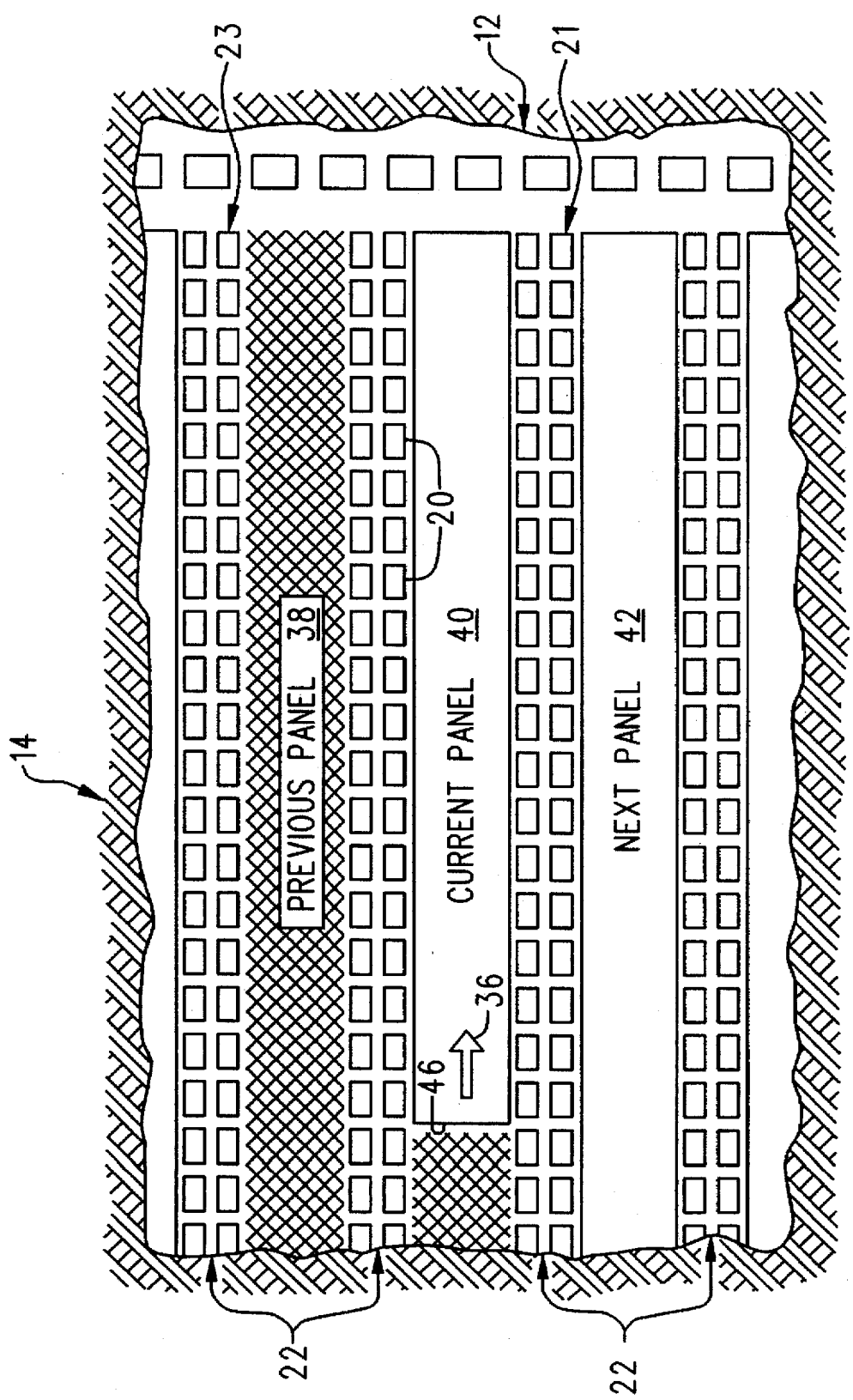
FIG. 2 is a plan view of a longwall mining system showing the panel currently being mined, the previous panel, and the next panel, gob is indicated by the crosshatched areas.
Figure 3:
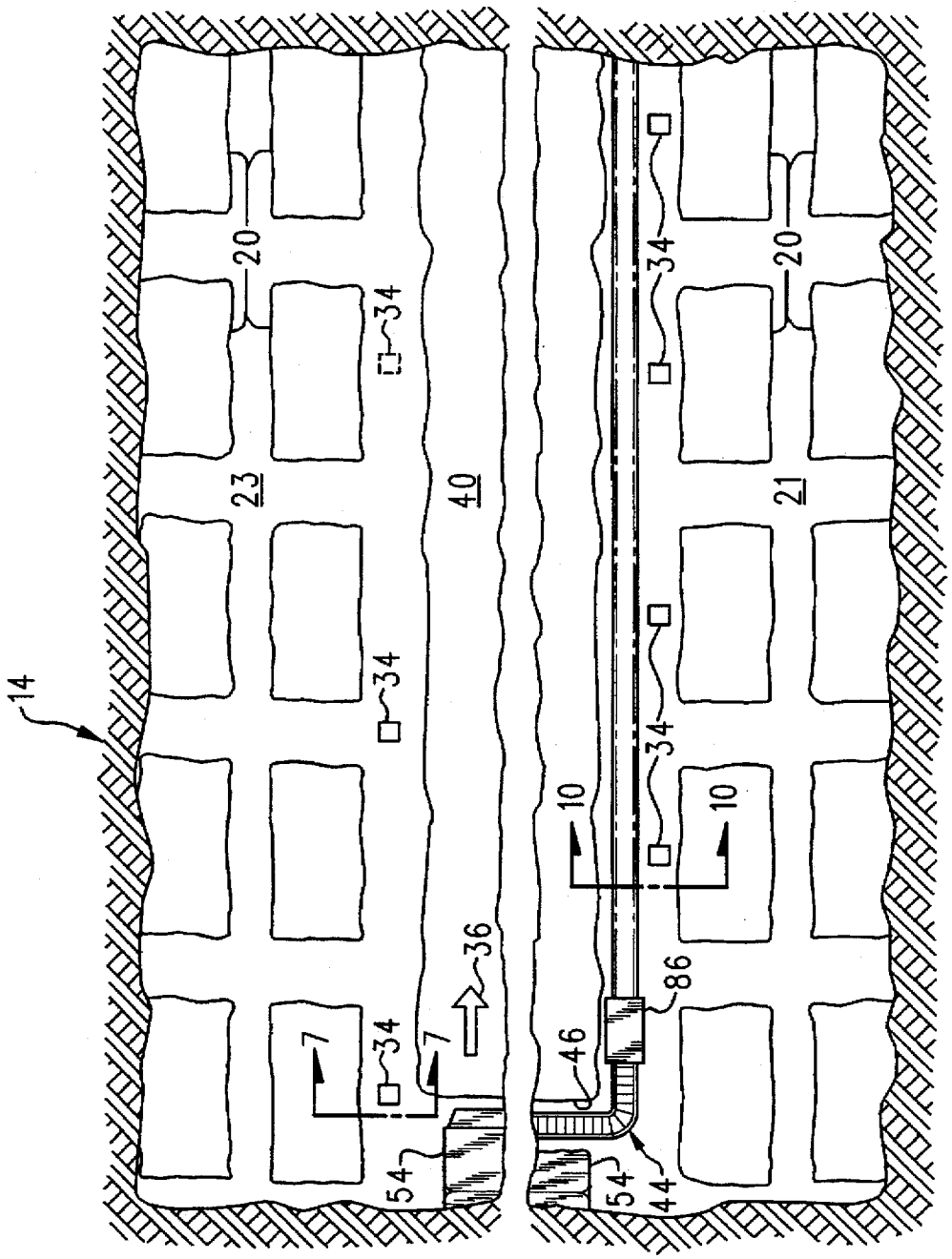
FIG. 3 is an enlarged plan view of the current panel shown in FIG. 2 showing the location of the convergence meters in the head and tail entries.

The apparatus 10 for determining the compressive stress in in-situ pillars is best seen in FIGS. 1–3 as it could be used to determine the compressive stress in pillars 20 located in an underground excavation being mined by a longwall mining system. In one preferred embodiment, the apparatus 10 may comprise a plurality of convergence meters 34 that are positioned at various locations within the head entry 21 and tail entry 23. Each convergence meter 34 is portable and produces an output signal that is indicative of the total entry convergence, i.e., roof sag and floor heave. The portable convergence meters 34 are connected to a data logger 48, which itself is connected to a computer system 52 and a memory system 50. The data logger 48 receives the output signals from the convergence meters 34 and converts them into a form suitable for use by both the computer system 52 and the memory system 50. The computer system 52 computes the compressive stress in the pillars 20 based on the magnitude of the entry convergence sensed by the various convergence meters 34 and displays the computed compressive stress on a suitable display device, such as a CRT (not shown).

As will be described in greater detail below, the computer system 52 computes the compressive stress based on the total entry convergence sensed by the meters 34. The computer system 52 also takes into account the type of load that is imposed on the pillars 20. For example, in most longwall mines the pillars 20 are subjected to at least three different types of loads during the longwall mining process: A first front abutment load, a side abutment load, and a second front abutment load. Of course, the pillars 20 are also subjected to a development load during the development phase of the mining operation. The particular type of load that is imposed on a given pillar 20 is related to the mining phase that is currently in progress; the location of the pillar 20 with respect to the advancing face 46 of the longwall panel 40; and on whether the pillar 20 is located in the head entry 21 or tail entry 23. Therefore, once the location of a particular pillar 20 is known (actually the location of the convergence meter 34 adjacent that pillar 20), the computer system 52 uses the entry convergence sensed by the convergence meter 34 to calculate the compressive stress in the adjacent pillar 20. Consequently, by using a plurality of convergence meters 34 positioned at strategic locations within the various entries, e.g., the head entry 21 and tail entry 23, it is possible to determine the compressive stress in any desired pillar 20 within the mine.

A significant advantage of the present invention is that the compressive stress within a given pillar may be determined from the measured entry convergence and the type of load that is on the pillar. Therefore, the present invention eliminates the need to measure compressive stress in the pillars directly, such as by the use of strain gauge transducers mounted within the pillars, with all their associated disadvantages. Furthermore, real-time convergence data from the convergence meters 34 may be compared to predetermined critical values for total entry convergence or roof deflection in order to determine the need to provide secondary roof support.

Another advantage associated with the present invention is that the convergence meters 34 used to measure the entry deflection are portable, thus can be easily moved from place to place within the mine in order to determine the compressive stress in any desired pillar 20 or set of pillars 20. The portable convergence meters 34 are also easy to install and do not require the time consuming drilling steps required to install strain gauge transducers directly within the pillars themselves. The portable convergence meters 34 may also be recovered at any point in the mining operation, thus preventing them from being lost to the gob.

Having summarized the method and apparatus for determining compressive stress in the pillars, as well as some of its more significant features and advantages, the invention will now be described in detail. As was mentioned above, the apparatus 10 for determining compressive stress in the pillars is shown and described herein as it could be used to determine the compressive stress in pillars 20 located in a longwall mining system. However, it should be understood that the present invention is not limited to use in longwall mining systems and could also be used in any type of underground excavation relying on in-situ pillars for roof support.

Referring now to FIG. 1, a coal seam 14 developed for a longwall mining system may comprise a main entry set 12, a pair of gateroad entries 22, and a bleeder set 32. The arrangement is such that a longwall panel 40 is defined between the main entry set 12, the pair of gateroad entries 22, and the bleeder set 32. The main entry set 12 comprises a plurality of entries 16 and cross-cuts 18 that together define a plurality of roof support pillars 20. Each gateroad entry set 22 is similar to the main entry set 12 and may comprise three entries 26 that are connected by a plurality of cross-cuts 28. The entries 26 and cross-cuts 28 of the gateroad entries 22 also define a plurality of roof support pillars 20. The bleeder set 32 connects the far end 28 of each gateroad entry set 22 and also comprises a plurality of roof support pillars 20. While the size of the longwall panel 40 defined by the various entry sets 12, 22, and 32 (i.e., mains, gateroads, and bleeder) may vary depending on the characteristics of the particular coal seam 14, most longwall panels tend to be rather large, having widths in the range of 500 to 1,000 feet and lengths of 6,000–15,000 feet or more.

In most longwall mining operations it is common to develop the gateroad entries 22 so that they define several adjacent longwall panels, each of which is then mined in succession. Referring now to FIG. 2, a typical multiple panel longwall mining system may comprise a plurality of gateroad entry sets 22 that define a plurality of longwall panels 38, 40, and 42. Longwall panel 38 has already been mined (i.e., removed), creating a gob (indicated by the cross hatched areas) and is referred to herein as the "previous panel." Longwall panel 40 is currently being mined and is referred to herein as the "current panel." As the current panel 40 is mined with a longwall mining machine (not shown), the face 46 is advanced into the panel 40 in the direction indicated by arrow 36. Longwall panel 42 is the next panel to be mined and is referred to as the "next panel."

In accordance with mining nomenclature, the gateroad entry set 22 located between the previous panel 38 and the current panel 40 is referred to as the "tail entry" 23, while the gateroad entry set 22 located between the current panel 40 and the next panel 42 is referred to as the "head entry" 21. The identification of the entries changes as a current longwall panel is completed (i.e., fully removed) and a new panel started. For example, the head entry 21 shown in FIG. 2 will become a tail entry upon the start of mining of the next panel 42. Consequently, the head entry 21 may be referred to herein as a future tail entry.

In most longwall mining systems, a network of line brattices (not shown) are constructed within the various entries to direct ventilation air (also not shown) down the head entry 21 and across the face 46 of the current panel 40. The ventilation air is then exhausted through the tail entry 23. The head entry 21 may also include provisions (not shown) for providing mine services to the face 46, such as electrical power and water. It is also common for the head entry 21 to include a conveyer system 44 for carrying away the coal that is removed from the face 46 of the current longwall panel 40. The roof immediately inby (i.e., behind) the face 46 is supported by a plurality of roof support shields 54, while the area behind the roof support shields 54 is allowed to cave-in, thus forming the gob.

As used herein, the term "inby" refers to those areas and things that are located behind the face 46, i.e., in a direction opposite the direction of advance 36. The term "outby" refers to those areas and things that are located ahead of the face 46, i.e., in the direction of advance 36.

Figure 4:
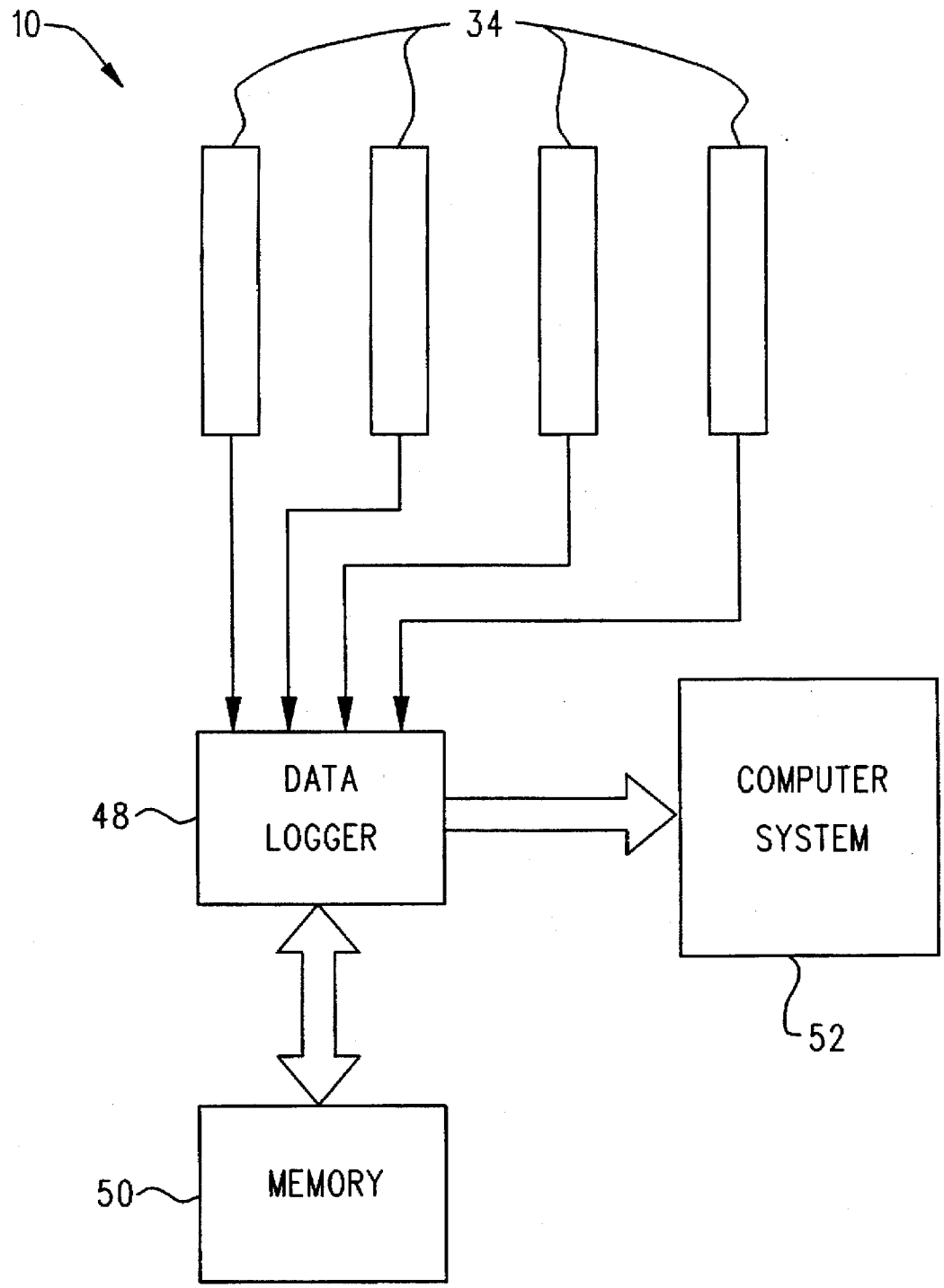
FIG. 4 is a block diagram of the system for collecting and processing convergence data from the convergence meters.

Referring now to FIG. 4, the apparatus 10 for determining compressive stress in the pillars may comprise a plurality of convergence meters 34 each of which is connected to the data logger 48. The data logger 48 is in turn connected to a computer system 52 and a memory system 50. In one preferred embodiment, the data logger 48 is located underground while the computer system 52 and memory system 50 are located on the surface.

Figure 5:
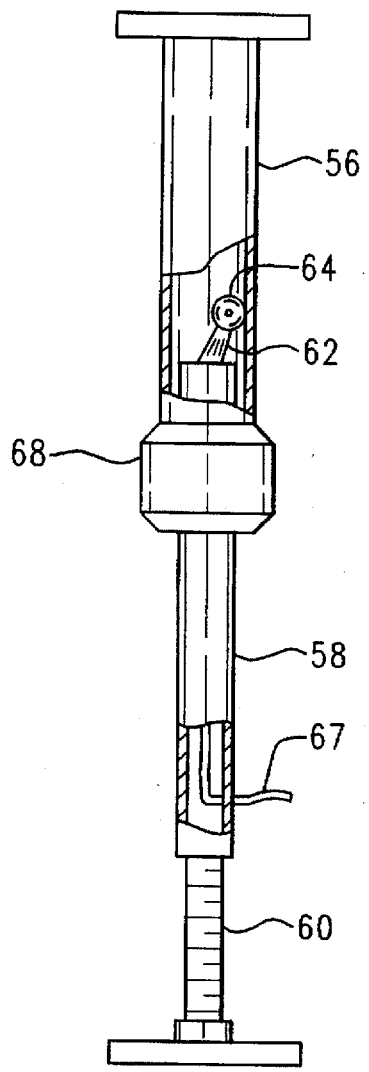
FIG. 5 is an enlarged view in elevation of a convergence meter with a portion of the upper column broken away to show the displacement sensing assembly.
Figure 6:
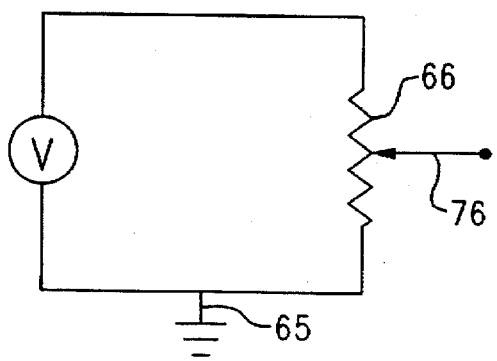
FIG. 6 is an electrical schematic of the displacement sensing assembly of the convergence meter shown in FIG. 5.
Figure 7:
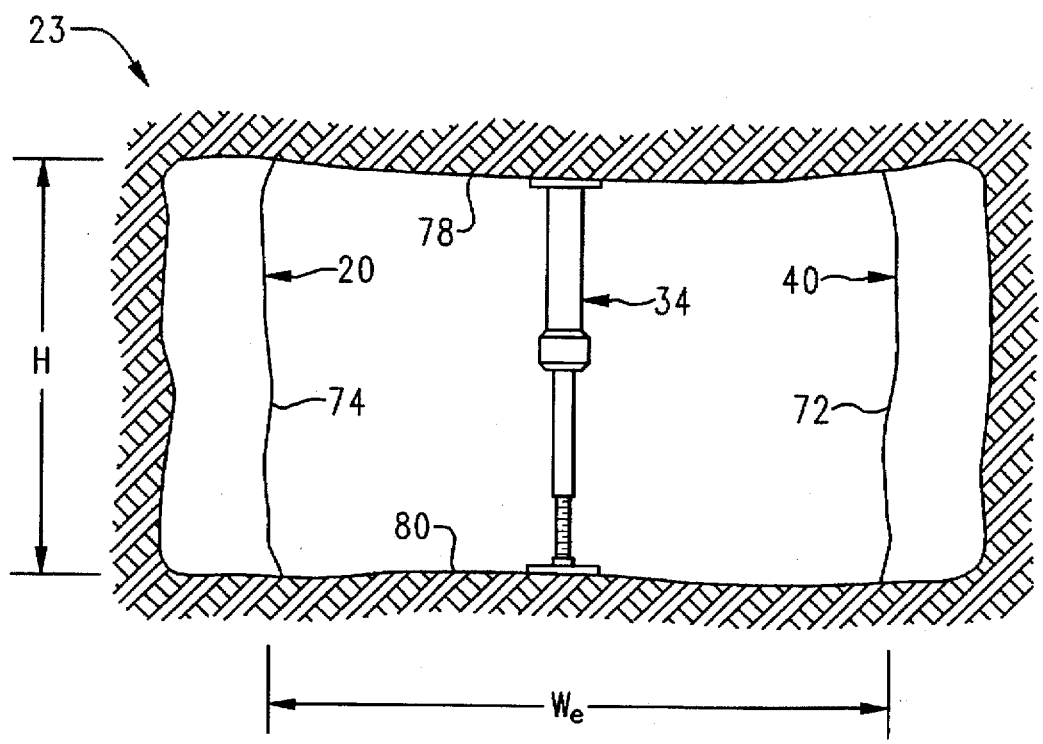
FIG. 7 is a side view in elevation taken along the line 7—7 of FIG. 3 showing the position of a convergence meter in the tail entry.

Each convergence meter 34 is identical to the others and comprises an upper column member 56 that is adapted to slidably receive a lower column member 58, as best seen in FIG. 5. Lower column member 58 also includes a displacement sensing assembly 62 having a wheel 64 that is connected to a rotary potentiometer 66 (FIG. 6). A friction ring 68 mounted to the upper column 56 may be rotated as necessary to increase and decrease the sliding friction between the upper and lower columns 56 and 58 to prevent the upper column 56 from sliding over the lower column 58 due to its own weight. The lower column 58 may also include a threaded adjustment stud 60 to allow the convergence meter 34 to accommodate different entry heights H (FIG. 7).

As mentioned above, each convergence meter 34 produces an analog output signal that is proportional to the total entry convergence, i.e., roof sag and floor heave. In one preferred embodiment, the output signal is produced by means of a rotary potentiometer 66 operating as a voltage divider, as is best seen in FIG. 6. Rotary potentiometer 66 is connected across a constant voltage source V, which may be supplied to the potentiometer from an outside source (not shown) via cable 67 (FIG. 5). Alternatively, the voltage source V may comprise a battery (also not shown) located within the convergence meter 34. In any event, the voltage on wiper element 76 will vary with respect to ground 65 depending on the position of the wiper 76. Since the wiper 76 of rotary potentiometer 66 is connected to the wheel 64 of displacement sensing assembly 62 (FIG. 5), the voltage appearing on wiper 76 is related to the displacement of the wheel 64. In one preferred embodiment, the convergence meter 34 may comprise a COR-P convergence meter manufactured by Rock Test, Inc., of New York.

Data logger 48 may essentially comprise an analog to digital converter, along with associated circuitry for converting the analog voltage signal from the convergence meters 34 into a form (e.g., digital) useable by computer system 52. Of course, data logger 48 should also include a sufficient number of signal input lines to accommodate the desired number of convergence meters 34. Data logger 48 also comprises an output terminal (not shown) suitable for transmitting signals to the computer system 52, such as, for example, via a dedicated telephone line. In one preferred embodiment, data logger 48 comprises a SENS-LOG Datalogger manufactured by Rock Test, Inc., of New York.

Computer system 52 may comprise a general purpose programmable computer, such as a personal computer, capable of running a program that embodies the method 110 of determining stress based on entry convergence, as will be explained in greater detail below. Computer system 52 may also include a suitable output or display device, such as a printer or CRT (not shown), for displaying information relating to pillar stress. In one preferred embodiment, computer system 52 comprises an IBM compatible personal computer.

Memory system 50 may comprise a non-volatile memory suitable for storing the analog signals received by the data logger 48. Alternatively, the memory system 50 could comprise part of the computer system 52, such as a floppy disk storage system or a hard disk storage system of the type commonly used with personal computers.

Figure 8:
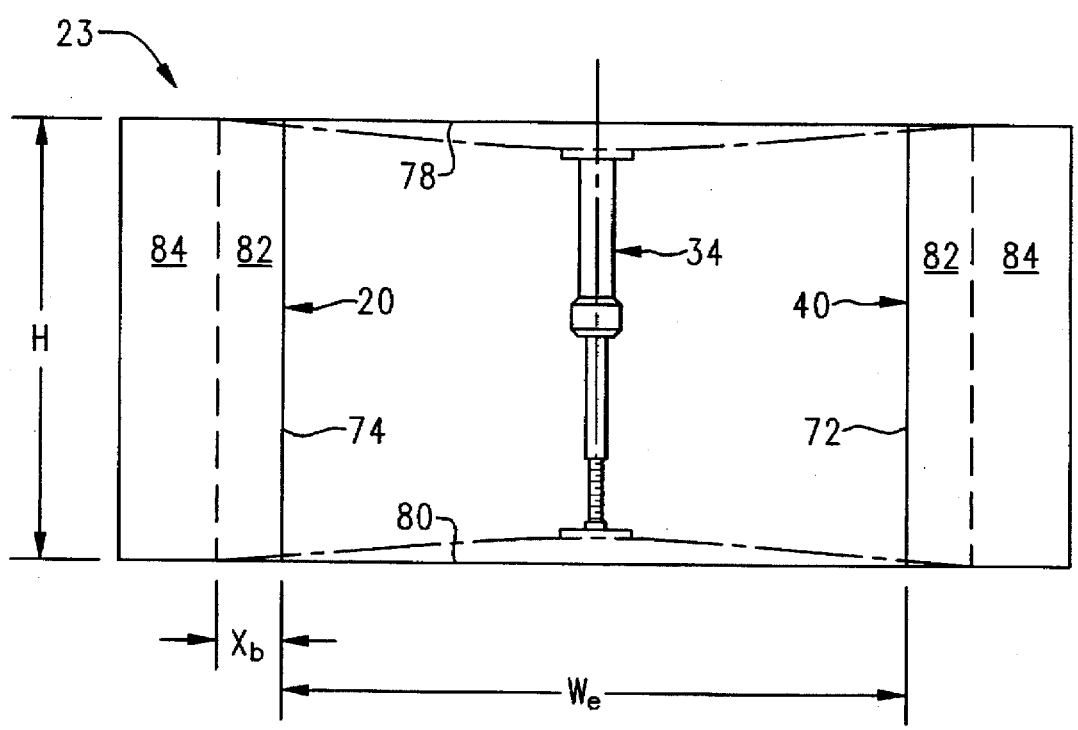
FIG. 8 is a schematic view in elevation of the convergence meter shown in FIG. 7 showing roof sag and floor heave.

The operation of the entry convergence meters 34 is best understood by referring to FIGS. 7 and 8 with occasional reference to FIGS. 5 and 6. Referring now to FIG. 7, a convergence meter 34 is shown as it could be installed in the tail entry 23 between the roof 78 and floor 80. It is preferred, but not required, that the meter 34 also be positioned substantially midway between the side wall or rib 72 of the entry 23 (the rib 72 being defined by panel 40) and the side wall or rib 74 of pillar 20. Deflection of the roof 78 and floor 80 (also referred to herein as roof sag and floor heave) will cause the upper and lower columns 56 and 58 to move together with respect to one another, as best seen in FIG. 8. As the upper and lower columns 56 and 58 move together, the wheel 64 of displacement sensing assembly 62 rolls along the interior wall 70 of upper column 56 (FIG. 5), thus moving the wiper 76 of rotary potentiometer 66 (FIG. 6). Since rotary potentiometer 66 is connected across a constant voltage V, movement of the wiper 76 results in a voltage change on wiper 76. The data logger 48 (FIG. 4) detects the voltage change on wiper 76 and converts it into a digital signal suitable for processing by the computer system 52.

Before proceeding with a detailed description of the method 110 (FIG. 12) used by the computer system 52 to compute the compressive stress in the pillars 20, it will be helpful to first discuss the mechanics of pillar loading and stress in general.

Referring to FIG. 7, a pillar supported entry, such as tail entry 23, may be regarded as a column structure for supporting a fixed ends beam. More specifically, the roof 78 may be regarded as the beam, the ends of which are supported by and fixed to the pillar 20 and the current panel 40. Assuming there is no stress in the beam to cause deflection (i.e., strain), the length of the overhead rock beam comprising the roof 78 is equal to the width of the entry $W_e$. Likewise, the height of the support columns (i.e., pillar 20 and current panel 40) is equal to the height H of the tail entry 23.

As the entry is developed (i.e., as coal is removed from the entry), the weight of the overburden is transferred to the pillar 20 and the panel 40 by the roof 78, which acts as the beam. Of course, the weight of the overburden also imposes on the beam, i.e., roof 78, a stress sufficient to result in deflection (i.e., sag) of the roof 78, as indicated by phantom lines in FIG. 8. The increased compressive loads on the pillar 20 and panel 40 may also result in a certain amount of floor deflection or heave as is also indicated by phantom lines in FIG. 8. Generally speaking, however, roof sag accounts for about 95% of the total entry convergence.

It has been discovered that the coal located on the outside surface of the pillar 20 and current panel 40 (i.e., the coal comprising the ribs 74 and 72, respectively) will yield if the compressive stress ($\sigma$) resulting from the transfer of the weight of the overburden to the pillar 20 and current panel 40 exceeds the in-situ uniaxial compressive strength ($\sigma_o$) of the coal material comprising the ribs 72, 74. If so, the result is the development of a yield zone 82 in the pillar 20 and in the current panel 40. See FIG. 8. While the yield zone 82 has failed and can take no more compressive load, the frictional strength of the yielded coal provides a horizontal restraining force to contain the elastic core 84, which does carry the compressive load. The frictional strength of the yielded coal in the yield zone 82 thus prevents the catastrophic shear failure of the pillar 20. As the pillar 20 continues to absorb additional loading, the width $x_b$ of the yield zone 82 may increase, i.e., the yield zone 82 may progress further into the interior of the pillar 20. Another effect of the yield zone 82 is that it increases the effective length of the overhead rock beam that comprises the roof 78. Thus, in the schematic illustrated in FIG. 8, the effective length of the overhead rock beam comprising the roof 78 is equal to the sum of the entry width $W_e$ and twice the yield zone width $x_b$. That is, the effective length of the overhead rock beam comprising the roof 78 is equal to $W_e + 2x_b$.

As was mentioned above, the pillars 20 in an underground excavation may be subjected to a variety of different loads depending on the particular stage of development of the entries as well as on their location with respect to the advancing face 46 of the longwall panel 40. The first load that the pillars 20 may be subjected to is the development load. The development load is imposed during the first mining phase, i.e., the development phase, and results from the removal of coal from the entry, thus leaving the pillars 20 to support the weight of the overburden. A certain amount of roof sag and/or floor heave will also occur as a result of the development load.

The second load to which pillars 20 may be subjected is the first front abutment load. Pillars 20 located in both the head and tail entries 21 and 23 are subjected to this load. The first front abutment load is generally at a maximum at the face 46, but its effects can be detected as far as 300 feet outby the face 46. Therefore, pillars 20 located between the face 46 and a distance of about 300 feet outby the face 46 may be regarded as being subjected to the first front abutment load.

The next type of load is the side abutment load. The side abutment load is an additional load that is imposed on pillars 20 that are located inby (i.e., behind) the face 46. All of the pillars 20 that are located in the head and tail entries 21 and 23 and inby the advancing face 46 are also subjected to the side abutment load. The side abutment load typically reaches a maximum at a distance of about 400 feet inby the face 46. Thus, pillars 20 located about 400 feet inby the face 46 are generally subjected to the maximum side abutment load.

Finally, certain of the pillars 20 may also be subjected to a second front abutment load. Essentially, the second front abutment load is that load caused by the extraction of the next panel 42 (FIG. 2). Thus, pillars located in the tail entry 23 are also subjected to the second front abutment load. Likewise, pillars 20 currently located in a head entry that will become a future tail entry will also eventually be subjected to the second front abutment load.

The foregoing loads tend to be cumulative. That is, most pillars 20 are subjected first to the development load, then to the first front abutment load, and finally the side abutment load. Further, those pillars 20 that are located between two longwall panels, such as current panel 40 and next panel 42, will also be subjected to the second front abutment load as the next panel 42 is mined. The effect of the accumulation of loads tends to constantly increase the width $x_b$ of the yield zone 82 which, of course, increases the stress σ in the elastic core 84. Therefore, the determination of compressive stress on a given pillar 20 should also be based on the knowledge of the type of load on that pillar 20. The relationship between compressive stress in the pillars and entry convergence for the various types of loads described above are discussed below.

Development Load

The average compressive stress $\sigma_d$ on a pillar 20 due to the development load is given by the following equation:

$$\sigma_d = \frac{\gamma h (W_e + W_p)(W_c + L_p)}{144 W_p L_p} \quad (1)$$

where:

γ=average unit weight of the overburden (lb/ft³);
h=depth of overburden (ft);
$W_e$=width of the entry (ft);
$W_p$=width of the pillar (ft);
$W_c$=cross-cut spacing (ft); and
$L_p$=length of the pillar (ft).

As was described above, if $\sigma_d$ exceeds the uniaxial compressive strength ($\sigma_o$) of the in-situ coal material at the pillar ribs (i.e., ribs 72 or 74), then the outer portion of the pillar 20 will fail. The width of the yield zone $x_b$ may be determined as follows:

$$x_b = \frac{H}{2}\left[\left(\frac{q}{p'}\right)^{\frac{1}{k-1}} - 1\right] \quad (2)$$

where:

H=pillar height (ft);
q=compressive stress on pillar (psi) (q=γh/144);
p'=apparent cohesion of the yielded coal (psi); and
k=triaxial stress factor: k=(1+sin φ)/(1−sin φ),
where φ=internal friction angle for coal);

Of course, if the outer portion of the coal pillar yields, the stress $\sigma_{de}$ in the elastic core will increase and is given by:

$$\sigma_{de} = \frac{\gamma h (W_e + W_p)(W_c + L_p)}{144(W_p - 2x_b)(L_p - 2x_b)} \quad (3)$$

First Front Abutment Load

The first front abutment load will generally increase the compressive stress in the pillars to the point where more yielding occurs in the yield zone 82, thus increasing its width. If so, the actual roof span $W_{1f}$ after the first front abutment load is imposed increases by twice the increased yield zone width and may be calculated as follows:

$$W_{1f} = \left[(W_e + 2x_b)^4 + \left(\frac{32Et^3}{p}\delta_{1f}\right)\right]^{1/4} \quad (4)$$

where:

E=Young's modulus of the rock beam roof (lb/ft²);
t=thickness of the rock beam roof (ft);
p=uniform load on the rock beam roof (lb/ft²); and
$\delta_{1f}$=entry convergence at the center of the entry due to the first front abutment load.

The stress change $\sigma_{1f}$ in the pillar 20 due to the first front abutment load is then given by:

$$\sigma_{1f} = (p' + q)\left[\frac{(W_{1f} - W_e)}{H} + 1\right]^{(k-1)} - \sigma_{de} \quad (5)$$

Side Abutment Load

As was the case for the first front abutment load, the side abutment load will also usually cause an expansion of the yield zone 82, thus increasing the effective width $W_s$ of the roof span. The effective width $W_s$ is given by:

$$W_s = \left[(W_e + 2x_b)^4 + \left(\frac{32Et^3}{p}\right)(\delta_{1f} + \delta_s)\right]^{1/4} \quad (6)$$

where:

$\delta_s$=entry convergence in the future tail entry caused by the side abutment load due to current panel extraction.

The stress change $\sigma_s$ in the pillar due to the side abutment load is then given by:

$$\sigma_s = (p' + \sigma_{de} + \sigma_{1f})\left[\frac{(W_s - W_e)}{H} + 1\right]^{(k-1)} - (\sigma_{de} + \sigma_{1f}) \quad (7)$$

Second Front Abutment Load

Finally, the second front abutment load will also usually increase the width of the yield zone 82 which, of course, also increases the effective roof span $W_{2f}$ of the future tail entry:

$$W_{2f} = \left[(W_e + 2x_b)^4 + \left(\frac{32Et^3}{p}\right)(\delta_{1f} + \delta_s + \delta_{2f})\right]^{1/4} \quad (8)$$

where:

$\delta_{2f}$=entry convergence in the future tail entry caused by the second front abutment load due to the next panel extraction.

The stress change $\sigma_{2f}$ in the pillar due to the second front abutment load is then given by:

$$\sigma_{2f} = (p' + \sigma_{de} + \sigma_{1f} + \sigma_s)\left[\frac{(W_{2f} - W_e)}{H} + 1\right]^{(k-1)} - (\sigma_{de} + \sigma_{1f} + \sigma_s) \quad (9)$$

Figure 9:
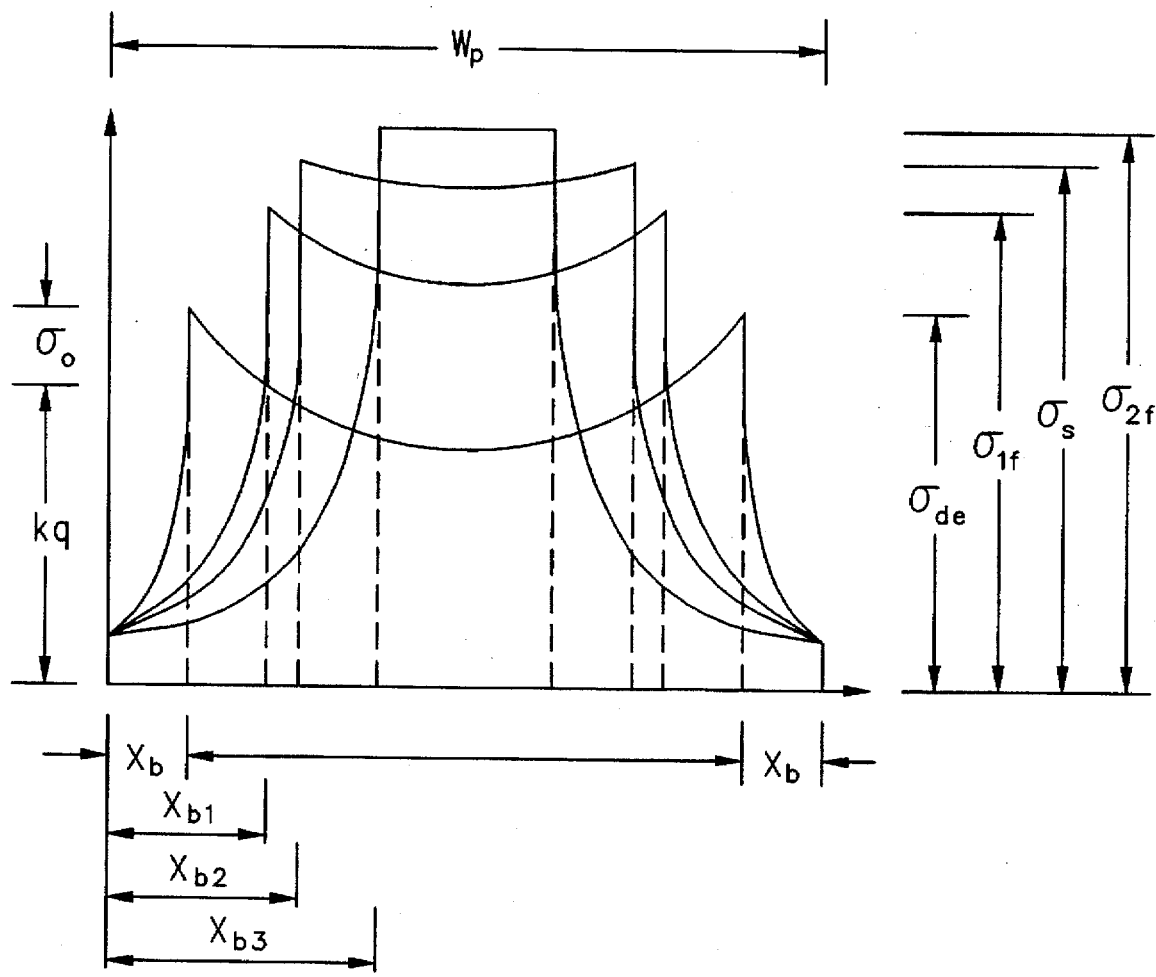
FIG. 9 is a graph showing the compressive stress under various loads in both the yield zone and in the elastic core of the pillar.

The effect of the accumulation of the various loads (i.e., development, first front abutment, side abutment, and second front abutment) is best seen in FIG. 9. More specifically, the successive addition of the loads tends to constantly increase the width of the yield zone 82 from a width $x_b$, corresponding to the development load, to successively increasing widths $x_{b1}$, $x_{b2}$, and $x_{b3}$ for the first front abutment, side abutment, and second front abutment loads, respectively. The increasing width of the yield zone 82 also decreases the cross-sectional area of the elastic core 84, the effect of which is to increase the stress σ in the core from a value of $\sigma_{de}$ for the development load to successively increasing values of $\sigma_{1f}$, $\sigma_s$, and $\sigma_{2f}$ for the first front abutment, side abutment, and second front abutment loads, respectively.

The foregoing discussion and calculations specifically relate to convergence meters 34 that are placed along the center line of the entries. The same discussion and calculations are also applicable to convergence meters that are not placed exactly on the center line of the entry, but rather are spaced some distance away from the entry center.

Figure 10:
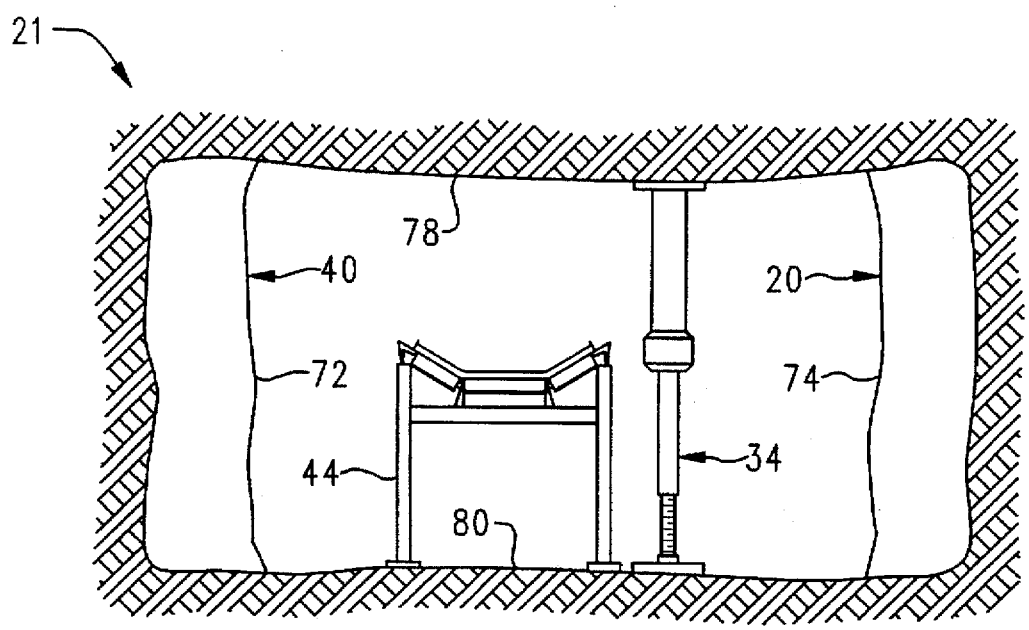
FIG. 10 is a side view in elevation taken along the line 10—10 of FIG. 3 showing the position of a convergence meter in the head entry.
Figure 11:
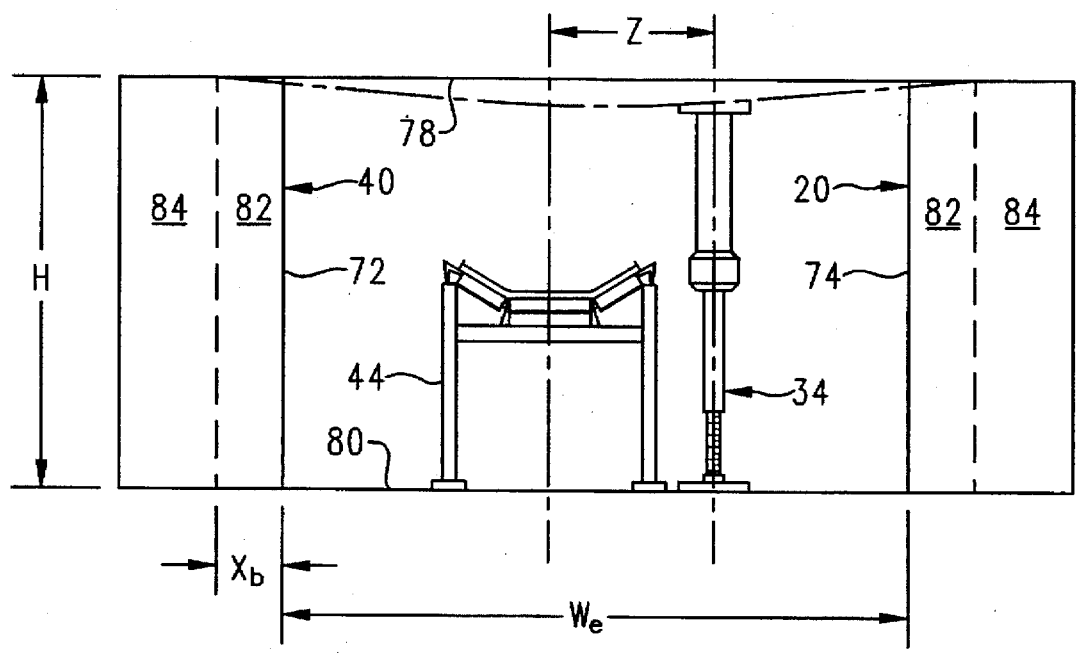
FIG. 11 is a schematic view in elevation of the convergence meter shown in FIG. 10 showing roof sag and floor heave and the displacement of the convergence meter from the centerline of the entry.

Referring now to FIGS. 3, 10, and 11, it may be necessary, due to the presence of equipment, such as conveyer system 44, to position the convergence meters 34 some distance z away from the center of the entry. If so, the convergence meters 34 will not measure the maximum convergence of the entry, but rather some lesser amount due to the fact that the meter 34 is displaced from the entry center line by a distance z. See FIG. 11. Therefore, it will be necessary for the computer system 52 to interpolate the true maximum entry convergence from the actual measured value by taking into account the offset distance z. In one preferred embodiment, the computer system uses a simple linear interpolation algorithm to compute the maximum entry convergence. However, any of a wide range of other types of interpolation algorithms could also be used, as would be obvious to persons having ordinary skill in the art.

Figure 12:
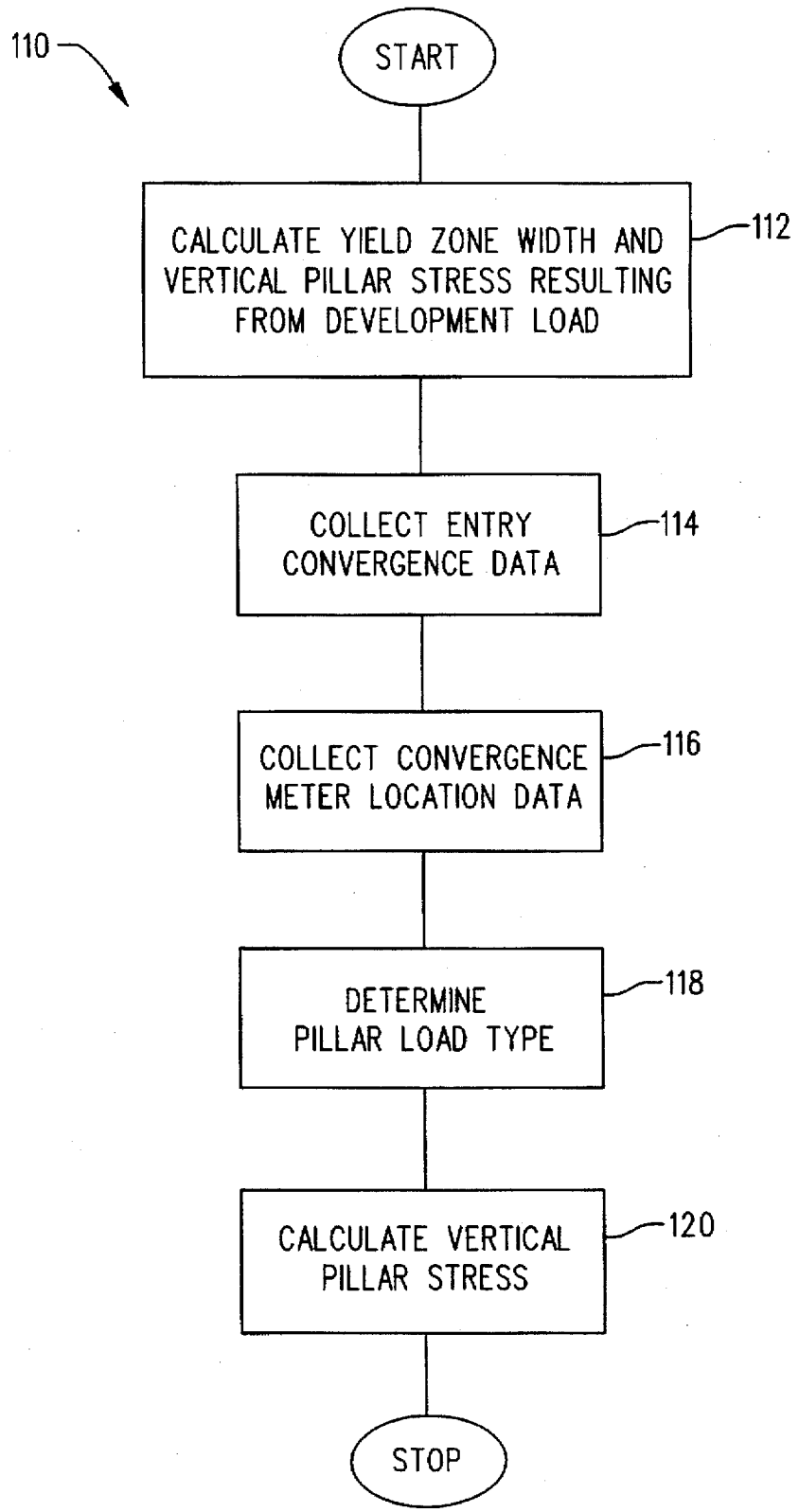
FIG. 12 is a flow diagram of the method for determining compressive stress according to the present invention.

Having set forth the equations relating compressive stress to entry convergence, the method 110 of calculating compressive stress in the pillars is best understood by referring to FIG. 12. The first step 112 in the process 110 is to calculate the width of the yield zone 82 (i.e., $x_b$) and average compressive pillar stress $\sigma_{de}$ after the development phase. The width $x_b$ of the yield zone 82 may be calculated according to equation (1), above, while the average compressive pillar stress $\sigma_{de}$ is determined from equation (2). Once these values have been determined, the computer system 52 proceeds to step 114. At step 114, the computer system 52 collects the data relating to the magnitude of entry convergence as sensed by the various convergence meters 34. Since the type of load on a particular pillar 20 depends on its location with respect to the advancing face 46, as well as whether it is located in a head entry 21 or a tail entry 23, as described above, information relating to the location of the various convergence meters 34 must also be input into the computer 52. This is accomplished at step 116. In one preferred embodiment, the information relating to the location of the convergence meters 34 is input by an operator (not shown) attending the system. However, other methods could also be used. For example, each convergence meter 34 could be equipped with a position sensing device for sensing the location of the meter with respect to some fixed point. A signal relating to the position of the meter 34 could then be sent to the computer system 52, which could then directly integrate the position signal into the program.

Regardless of the particular means used to inform the computer system 52 of the location of the various convergence meters 34, once such data have been input, the computer system 52 then executes step 118 to determine the type of load being placed on the pillars 20 adjacent each convergence meter 20. As was briefly described above, the pillars 20 are subjected to various types of loads depending on their position within the various entries. That is, those pillars 20 located outby the advancing face 46 and in a head entry 21 will be subjected to the development load and the first front abutment load. Since the development load has already resulted in a certain amount of entry convergence (i.e., roof sag and/or floor heave) that has already been accounted for in step 112, any change in entry convergence $\delta_{1f}$ is due solely to the first front abutment load. Thus, the stress $\sigma_{1f}$ in the adjacent pillar may be calculated according to equations (4) and (5). The resulting data may then be presented on a suitable display device, such as a CRT (not shown). The compressive stress due to the first front abutment loads may by similarly calculated for all pillars positioned in locations where they are subjected to such loading.

As the longwall mining process progresses, the face 46 of the current panel 40 will advance in the direction of arrow 36 so that more and more of the pillars 20 will be located inby the advancing face 46. As each pillar is overtaken or passed by the face 46, it will become subjected to the side abutment load. Accordingly, entry convergence data from convergence meters 34 located inby the face 46 will include entry deflection due to the side abutment load. The computer 52 may then calculate the change in compressive pillar stress $\sigma_s$ due to the side abutment load as per equations (6) and (7). Again, the resulting data may be displayed and saved in memory for subsequent use.

The compressive stress $\sigma_{2f}$ resulting from the second front abutment load may be similarly computed using equations (8) and (9). Recall from the foregoing description that pillars 20 located in tail entries, such as tail entry 23, will be subjected to the second front abutment load as the face 46 of the current panel 40 approaches. Similarly, those pillars 20 located in future tail entries (e.g., pillars 20 located in current head entry 21) will be subjected to the second front abutment load upon mining of the next panel 42. Therefore, most of the pillars 20 in a longwall mining system will eventually be exposed to all four loads in succession: The development load, the first front abutment load, the side abutment load, and the second front abutment load.

Thus far, the description of the invention has been directed to the determination of compressive stress in pillars 20 when the convergence meters 34 are located in stationary positions. However, to reduce the number of convergence meters 34 required to determine compressive stress in the pillars 20 throughout the mine, it is preferred, though not required, that an actual longwall operation utilize only few convergence meters 34.

For example, one embodiment of a method for using six (6) convergence meters 34 to determine compressive stress in the pillars 20 is shown in FIG. 3. Two convergence meters 34 are placed in the tail entry 23 so that they are located about 150 feet apart. When the face 46 advances to about the position of the first convergence meter 34, the first meter 34 is moved to a position about 150 feet outby the second convergence meter 34, as shown in broken lines in FIG. 3. Then, when the face 46 has advanced to about the position of the second meter 34, the second meter 34 is "leap frogged" over the first, now repositioned meter 34 (indicated by broken lines in FIG. 3). The meters 34 in the tail entry 23 may continue to be leap frogged over one another as the face 46 is advanced, thus allowing the meters 34 to continuously monitor the entry convergence (thus compressive stress in the pillars) caused by the second front abutment load. (Recall that since these pillars 20 are located in the tail entry 23, they have already been subjected to the development, first front abutment, and side abutment loads. Therefore, the only new load they are subjected to is the second front abutment load).

The method of leap frogging the convergence meters 34 in the head entry 21 is similar, except that four (4) convergence meters 34 are used, each being separated from the others by a distance of about 80 to 125 feet. When the inby meter 34 (i.e., the inner-most meter 34) is approached by the advancing stage loader 86, it is moved to a position 80 to 125 feet outby the outer-most meter 34 (the rightmost meter 34 in FIG. 3). As was the case for the convergence meters 34 in the tail entry 23, the convergence meters 34 in the head entry 21 continue to be advanced in the leap-frog like manner as the face 46 of the current panel 40 is advanced. The compressive stresses derived from the convergence measurements of the meters 34 in the head entry result from the first front abutment load. If the stresses resulting from the side abutment load are to be measured, then additional convergence meters 34 (not shown) may be installed in the head entry 21 at positions located inby the advancing face 46. The meters 34 may also be advanced in a leap-frog like manner so as to monitor the entry convergence to a distance of about 400 feet inby the face 46.

This completes the detailed description of the method and apparatus for determining compressive pillar stress according to the present invention. While a number of specific components were described above for the preferred embodiments of this invention, persons skilled in this art will readily recognize that other substitute components or combinations of components may be available now or in the future to accomplish comparable functions to methods and apparatus described herein. For example, the method and apparatus of the present invention may be used to determine the compressive pillar stress in nearly any type of underground excavation in which pillars are used to provide primary roof support. Accordingly, and the present invention should not be regarded as limited to the determination of compressive pillar stress in longwall mining systems.

Other possible substitutes have been mentioned throughout this description, and many more equivalents are possible. For example, the convergence meters 34 shown and described herein measure total entry convergence, i.e., roof sag and floor heave. However, in many mines, floor heave is not significant, and meters 34 could instead be used that monitor only the amount of roof sag. The particular leap frogging method of advancing the convergence meters 34 is also not particularly critical, and any of a wide variety of other methods could be used to advance the convergence meters 34 along with the face 46.

Consequently, the foregoing is considered illustrative only of the principles of the invention. Further, since numerous other modifications and changes will readily occur to those skilled in the art, it is not desired to limit the invention to the exact construction and operation shown and described, and accordingly, all suitable modifications and equivalents may be resorted to as falling within the scope of the invention as defined by the claims which follow.

What is claimed is:

1. A method of determining compressive stress in an in-situ roof support pillar in an underground excavation, the underground excavation including an entry set having a roof, a floor, and two opposed ribs, the roof support pillar extending between the roof and the floor of the entry set and located between the two opposed ribs of the entry set such that the entry set is divided into two entries, comprising the steps of:

measuring an amount of entry convergence in one of the two entries of the entry set at a point substantially between the roof support pillar and one of the two opposed ribs of the entry set;

determining a type of load on the pillar; and calculating the compressive stress in the pillar based on the amount of entry convergence and based on the type of load on the pillar.

2. The method of claim 1, wherein the step of determining a type of load on the pillar comprises the step of determining whether the pillar is being subjected to at least one of a number of load types including a first front abutment load, a second front abutment load, and a side abutment load.

3. A method of determining compressive stress in an in-situ roof support pillar in an underground excavation, the underground excavation including an entry set having a roof, a floor, and two opposed ribs, the roof support pillar extending between the roof and the floor of the entry set and located between the two opposed ribs of the entry set such that the entry set is divided into two entries, comprising the steps of:

measuring an amount of entry convergence in one of the two entries of the entry set at a point substantially between the roof support pillar and one of the two opposed ribs of the entry set;

determining a type of load on the pillar, the type of load including at least a first front abutment load, a second front abutment load, and a side abutment load;

calculating an effective roof span between the pillar and the rib based on the amount of entry convergence and the type of load on the pillar; and calculating the compressive stress in the pillar based on the effective roof span and the amount of entry convergence.

4. The method of claim 3, wherein the effective roof span for the first front abutment load is calculated according to the equation:

$$W_{1f} = \left[ (W_e + 2x_b)^4 + \left( \frac{32Et^3}{p} \delta_{1f} \right) \right]^{\frac{1}{4}}$$

where:

$W_e$ = a width of the entry (ft);

$X_b$ = a width of a yield zone of the pillar (ft);

E = a Young's modulus of the rock beam roof (lb/ft$^2$);

t = a thickness of a rock beam roof (ft);

p = a uniform load on the rock beam roof (lb/ft$^2$); and $\delta_{1f}$ = the amount of entry convergence due to the first front abutment load.

5. The method of claim 4, wherein the compressive stress in the pillar for the first front abutment load is calculated according to the equation:

$$\sigma_{1f} = (p' + q) \left[ \frac{(W_{1f} - W_e)}{H} + 1 \right]^{(k-1)} - \sigma_{de}$$

where:

p' = an apparent cohesion of yielded coal (psi);

q = a compressive stress on the pillar from a development load; and $\sigma_{de}$ = a compressive stress in an elastic core of the pillar.

6. The method of claim 5, wherein the effective roof span for the side abutment load is calculated according to the equation:

$$W_s = \left[ (W_e + 2x_b)^4 + \left( \frac{32Et^3}{p} \right)(\delta_{1f} + \delta_s) \right]^{\frac{1}{4}}$$

where:

$\delta_s$ = an amount of entry convergence due to the side abutment load.

7. The method of claim 6, wherein the compressive stress in the pillar for the side abutment load is calculated according to the equation:

$$\sigma_s = (p' + \sigma_{de} + \sigma_{1f}) \left[ \frac{(W_s - W_e)}{H} + 1 \right]^{(k-1)} - (\sigma_{de} + \sigma_{1f})$$

8. The method of claim 7, wherein the effective roof span for the second front abutment load is calculated according to the equation:

$$W_{2f} = \left[ (W_e - 2x_b)^4 + \left( \frac{32Ef^3}{p} \right) (\delta_{1f} + \delta_s + \delta_{2f}) \right]^{\frac{1}{4}}$$

where:

$\delta_{2f}$=an amount of entry convergence due to the second front abutment load.

9. The method of claim 8, wherein the compressive stress in the pillar for the second front abutment load is calculated according to the equation:

$$\sigma_{2f} = (p' + \sigma_{de} + \sigma_{1f} + \sigma_s) \left[ \frac{(W_{2f} + W_e)}{H} + 1 \right]^{(k-1)} - (\sigma_{de} + \sigma_{1f} + \sigma_s)$$

10. Apparatus for determining compressive stress in an in-situ roof support pillar in an underground excavation, the underground excavation including an entry set having a roof, a floor, and two opposed ribs, the roof support pillar extending between the roof and the floor of the entry set and located between the two opposed ribs of the entry set such that the entry set is divided into at least two entries, comprising:

a convergence meter positioned in at least one of the two entries for measuring an amount of entry convergence and generating an output signal related thereto; and a computer connected to said convergence meter and responsive to the output signal for calculating the compressive stress in the pillar based on the amount of entry convergence and based on whether the pillar is being subjected to at least one of a number of load types including a first front abutment load, a second front abutment load and a side abutment load.

11. The apparatus of claim 10, further comprising a data logger connected to said convergence meter and to said computer, wherein said data logger converts the output signal from said convergence meter into a form usable by said computer.

12. The apparatus of claim 11, further comprising a memory storage system connected to said data logger for storing the output signal from said convergence meter.

13. A method of monitoring entry convergence in an underground excavation having at least one head entry set and at least one tail entry set positioned in spaced-apart relation so as to define a panel therebetween, the panel having a face from which material is removed so as to advance the face into the panel, the head and tail entry sets also being supported by a plurality of pillars, comprising the steps of:

(a) measuring the entry convergence in the tail entry set with a first monitoring station having a first convergence meter positioned at a first location outby the face and a second convergence meter positioned at a second location outby the first location of the first convergence meter; and (b) measuring the entry convergence in the head entry set with a second monitoring station having a first convergence meter positioned at a first location outby the face, a second convergence meter positioned at a second location outby the first location, a third convergence meter positioned at a third location outby the second location, and a fourth convergence meter positioned at a fourth location outby the third location.

14. A method of monitoring entry convergence in an underground excavation having at least one head entry set and at least one tail entry set positioned in spaced-apart relation so as to define a panel therebetween, the panel having a face from which material is removed so as to advance the face into the panel, the head and tail entry sets also being supported by a plurality of pillars, comprising the steps of:

(a) measuring the entry convergence in the tail entry set with a first monitoring station having a first convergence meter positioned at a first location outby the face and a second convergence meter positioned at a second location outby the first location of the first convergence meter;

(b) measuring the entry convergence in the head entry set with a second monitoring station having a first convergence meter positioned at a first location outby the face, a second convergence meter positioned at a second location outby the first location, a third convergence meter positioned at a third location outby the second location, and a fourth convergence meter positioned at a fourth location outby the third location;

(c) as the face is advanced into the panel:

(i) moving the first convergence meter of the first monitoring station to a third location outby the second location of the second convergence meter when the face has been advanced to a position about adjacent the first location;

(ii) moving the second convergence meter of the first monitoring station to a fourth location outby the third location when the face has been advanced to a position about adjacent the second location;

(iii) moving the first convergence meter of the second monitoring station to a fifth location outby the fourth location when the face has been advanced to a position about adjacent to the first location;

(iv) moving the second convergence meter of the second monitoring station to a sixth location outby the fifth location when the face has been advanced to a position about adjacent to the second location;

(v) moving the third convergence meter of the second monitoring station to a seventh location outby the sixth location when the face has been advanced to a position about adjacent to the third location;

(vi) moving the fourth convergence meter of the second monitoring station to an eighth location outby the seventh location when the face has been advanced to a position about adjacent to the fourth location;

(d) continuing to measure the entry convergence in the tail entry and in the head entry with the first and second convergence meters of the first monitoring station and the first, second, third, and fourth convergence meters of the second monitoring station, respectively; and (e) repeating steps (c) and (d) as the face continues to be advanced into the panel.

15. The method of claim 14, further comprising the step of:

(f) calculating compressive stress in the pillars supporting the head entry and the tail entry based on the total entry convergence measured by said first and second monitoring stations.

16. Apparatus for determining compressive stress in at least one of a plurality of in-situ roof support pillars in an underground excavation having at least one head entry set and at least one tail entry set positioned in spaced-apart relation so as to define a panel therebetween, the panel having a face from which material is removed so as to advance the face into the panel, comprising:

a first monitoring station for measuring the entry convergence in the tail entry, said first monitoring station having a first convergence meter positioned at a first location outby the face and a second convergence meter positioned at a second location outby the first location of the first convergence meter;

a second monitoring station for measuring the entry convergence in the head entry, said second monitoring station having a first convergence meter positioned at a first location outby the face, a second convergence meter positioned at a second location outby the first location, a third convergence meter positioned at a third location outby the second location, and a fourth convergence meter positioned at a fourth location outby the third location; and compressive stress calculation apparatus connected to said first and second monitoring stations for calculating a compressive stress in at least one of the pillars based on entry convergence and based on whether the pillar for which the compressive stress is being calculated is being subjected to at least one of a number of load types including a first front abutment load, a second front abutment load and a side abutment load.

17. A method of determining compressive stress in an in-situ roof support pillar in an underground excavation, the underground excavation including an entry set having a roof, a floor, and two opposed ribs, the roof support pillar extending between the roof and the floor of the entry set and located between the two opposed ribs of the entry set such that the entry set is divided into two entries, comprising the steps of:

measuring an amount of roof deflection in one of the two entries of the entry set at a point substantially between the roof support pillar and one of the two opposed ribs of the entry set;

determining a type of load on the pillar; and calculating the compressive stress in the pillar based on the amount of roof deflection and based on the type of load on the pillar.

* * * * *

UNITED STATES PATENT AND TRADEMARK OFFICE
CERTIFICATE OF CORRECTION

PATENT NO. : 5,668,325
DATED : September 16, 1997
INVENTOR(S) : Hart et al.

It is certified that error appears in the above-identified patent and that said Letters Patent is hereby corrected as shown below:

Column 6, line 52, delete "Rock Test, Inc." and insert therefor --RocTest, Inc.--

Column 6, line 64, delete "Rock Test, Inc." and insert therefor --RocTest, Inc.--

Column 10, line 30 delete

" $W_{2f} = [(W_e + 2x_b)^4 + (\frac{32Et^3}{p})(\delta_{1f} + \delta_s + \delta_{1f})]^{\frac{1}{4}}$ (8) "

and insert therefor

-- $W_{2f} = [(W_e + 2x_b)^4 + (\frac{32Et^3}{p})(\delta_{1f} + \delta_s + \delta_{2f})]^{\frac{1}{4}}$ (8) --.

Column 15, line 1, delete

" $W_{2f} = [(W_e = 2x_b)^4 + (\frac{32Et^3}{p})(\delta_{1f} + \delta_s + \delta_{2f})]^{\frac{1}{4}}$ "

and insert therefor

-- $W_{2f} = [(W_e + 2x_b)^4 + (\frac{32Et^3}{p})(\delta_{1f} + \delta_s + \delta_{2f})]^{\frac{1}{4}}$ --.

UNITED STATES PATENT AND TRADEMARK OFFICE
CERTIFICATE OF CORRECTION

PATENT NO. : 5,668,325
DATED : September 16, 1997
INVENTOR(S) : Hart et al.

It is certified that error appears in the above-identified patent and that said Letters Patent is hereby corrected as shown below:

Column 15, line 12, delete $$\text{"} \sigma_{2f} = (p' + \sigma_{de} + \sigma_{1f} + \sigma_s)[\frac{(W_{2f} + W_e)}{H} + 1]^{(k-1)} - (\sigma_{de} + \sigma_{1f} + \sigma_s) \text{"}$$

and insert therefor $$-- \sigma_{2f} = (p' + \sigma_{de} + \sigma_{1f} + \sigma_s)[\frac{(W_{2f} - W_e)}{H} + 1]^{(k-1)} - (\sigma_{de} + \sigma_{1f} + \sigma_s) --.$$

Signed and Sealed this

Seventeenth Day of February, 1998

Attest:

BRUCE LEHMAN

Attesting Officer

Commissioner of Patents and Trademarks